United States Patent
Burkholder et al.

(10) Patent No.: US 6,438,938 B1
(45) Date of Patent: Aug. 27, 2002

(54) BEARING COMPARTMENT SELF COOLING VENT SYSTEM

(75) Inventors: Philip Scott Burkholder, Pittsboro; Mark Allen Winely, Avon, both of IN (US); Kevin Chin, Houston, TX (US)

(73) Assignee: Rolls-Royce Corporation, Indianapolis, IN (US)

( * ) Notice: Subject to any disclaimer, the term of this patent is extended or adjusted under 35 U.S.C. 154(b) by 56 days.

(21) Appl. No.: 09/776,353

(22) Filed: Feb. 2, 2001

Related U.S. Application Data
(60) Provisional application No. 60/253,474, filed on Nov. 28, 2000.

(51) Int. Cl.$^7$ .............................................. F02C 7/06
(52) U.S. Cl. ..................................... 60/39.08; 184/6.11
(58) Field of Search ....................... 60/39.08; 184/6.11, 184/6.23

(56) References Cited

U.S. PATENT DOCUMENTS

| | | | |
|---|---|---|---|
| 3,486,582 A | 12/1969 | Carter et al. | |
| 3,722,212 A | 3/1973 | Stein | |
| 3,740,170 A | 6/1973 | Miller | |
| 4,020,632 A | 5/1977 | Coffinberry et al. | |
| 4,046,223 A | 9/1977 | McHugh | |
| 4,073,596 A | 2/1978 | Erickson et al. | |
| 4,107,927 A | 8/1978 | Gordon, Jr. et al. | |
| 4,109,920 A | 8/1978 | Wiese | |
| 4,137,705 A | 2/1979 | Andersen et al. | |
| 4,156,342 A | 5/1979 | Korta et al. | |
| 4,204,573 A | 5/1980 | Clark | |
| 4,284,174 A | * 8/1981 | Salvana et al. | 184/6.26 |
| 4,339,160 A | * 7/1982 | McHugh | 384/130 |
| 4,451,200 A | 5/1984 | Libertini et al. | |
| 4,500,143 A | 2/1985 | Kervistin et al. | |
| 4,645,415 A | 2/1987 | Hovan et al. | |
| 4,755,103 A | 7/1988 | Streifinger | |
| 4,914,904 A | 4/1990 | Parnes et al. | |
| 4,947,963 A | 8/1990 | Aho, Jr. | |
| 5,125,792 A | 6/1992 | Korenblit | |
| 5,489,190 A | * 2/1996 | Sullivan | 184/6.11 |

* cited by examiner

Primary Examiner—Charles G. Freay
(74) Attorney, Agent, or Firm—Woodard, Emhardt, Naughton Moriarty & McNett (57) ABSTRACT

An apparatus for use in the bearing compartment of a gas turbine engine includes a first conduit and a second conduit. The first conduit defines inner and outer surfaces between an inlet end and an outlet end. The second conduit defines inner and outer surfaces between an inlet end and an outlet end. At least a portion of the second conduit is substantially coaxial with and enclosed by at least a portion of the first conduit. One of the first conduit or the second conduit is a lubricant feed to the bearing compartment. The other of the first conduit and the second conduit is the air vent from the bearing compartment.

24 Claims, 6 Drawing Sheets

BEARING COMPARTMENT SELF COOLING VENT SYSTEM

The present application claims the benefit of United States Provisional Patent Application Ser. No. 60/253,474 filed Nov. 28, 2000 entitled BEARING COMPARTMENT SELF COOLING VENT SYSTEM. The provisional application is incorporated herein by reference.

BACKGROUND OF THE INVENTION

The present invention generally relates to a system for feeding pressurized lubricant to bearings within a gas turbine engine bearing compartment. More particularly, in one form the present invention defines a single dual-purpose tube including a lubricant feed-in passageway and air vent-out passageway. Although the present invention was developed for use in gas turbine engines, certain applications may be outside this field.

A gas turbine engine is typical of the type of turbomachinery in which the concept described herein may be advantageously employed. A gas turbine engine conventionally includes a compressor for compressing inlet air to an increased pressure for combustion in a combustion chamber. A mixture of fuel and the increased pressure air is burned in the combustion chamber to generate a high temperature gaseous flow stream for causing rotation of turbine blades within the turbine. The turbine blades convert the energy from the high temperature gaseous flow stream into kinetic energy, which is utilized to turn a propeller, fan, or other device. Further, the high temperature gaseous flow stream may be used directly as thrust for providing motive power, such as in a turbine jet engine.

It is well known that many components within gas turbine engines rotate at extremely high speeds. The rotatable components are generally supported by bearings located within bearing compartments. Due to the forces, temperature and speeds associated with gas turbine engine components the lubrication requirements normally necessitate the use of a forced lubrication system in order to provide adequate lubricant to the bearing compartment. A pressurized lubricant is generally fed into the bearing compartment to provide lubrication and/or cooling for the bearing, scavenge lubricant is returned from the bearing compartment and recycled for further use by cooling and/or deaerating, and an air vent line is utilized to allow air and/or an air/lubricant mixture to escape from the bearing compartment.

The continued desire for increased efficiency in gas turbine engines results in higher operating temperatures proximate the bearing compartments within the gas turbine engines. Therefore, there is an increased amount of heat transferred to the lubricants in the bearing compartments which causes lubricant deterioration, and coking may result, forming coke or sludge deposits. Coking in the air vent line can lead to blockage of the air vent line and cause overpressurization of the bearing compartment.

Thus, a need remains for further contributions in this area of technology. The present inventions satisfies this need in a novel and non-obvious fashion.

SUMMARY OF THE INVENTION

In one embodiment of the present invention there is contemplated an apparatus coupled to a bearing compartment of a gas turbine engine comprising a first conduit and a second conduit. The first conduit has an inner surface and an outer surface, and the second conduit has an inner surface and an outer surface. At least a portion of the second conduit is substantially enclosed by at a portion of the first conduit such that the outer surface of the second conduit generally faces the inner surface of the first conduit. One of the first conduit and the second conduit is a lubricant feed conduit adapted for the passage of a lubricant to the bearing compartment. The other of the first conduit and the second conduit is an air vent conduit adapted for the passage of a vent air from the bearing compartment.

In another embodiment of the present invention there is contemplated a system including a gas turbine engine having a bearing housing. The system also includes a first conduit and a second conduit. The first conduit has an inner surface and an outer surface, and the second conduit has an interior surface and an exterior surface. At least a portion of the first conduit is positioned within the second conduit. The inner surface of the first conduit defines a fluid flow passageway in fluid communication with the bearing compartment and adapted to vent air from the bearing compartment. The interior surface of the second conduit defines a second fluid flow passageway in fluid communication with the bearing compartment and adapted to feed lubricant to the bearing compartment.

In another embodiment of the present invention there is contemplated a method for delivering a lubricant to a gas turbine engine bearing compartment. The method includes the acts of feeding the lubricant through a first fluid flow passageway to the bearing compartment, and flowing a vent air from the bearing compartment through a second fluid flow passageway. The second fluid flow passageway is surrounded by and in heat transfer association with the first fluid flow passageway.

One object of the present invention is to provide a design that cools the vented air with the pressurized oil feed.

Further forms, objects, features, aspects, benefits, advantages and embodiments of the present invention shall become apparent from the detailed description and drawings provided herewith.

DESCRIPTION OF THE PREFERRED EMBODIMENTS

For the purpose of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 1:
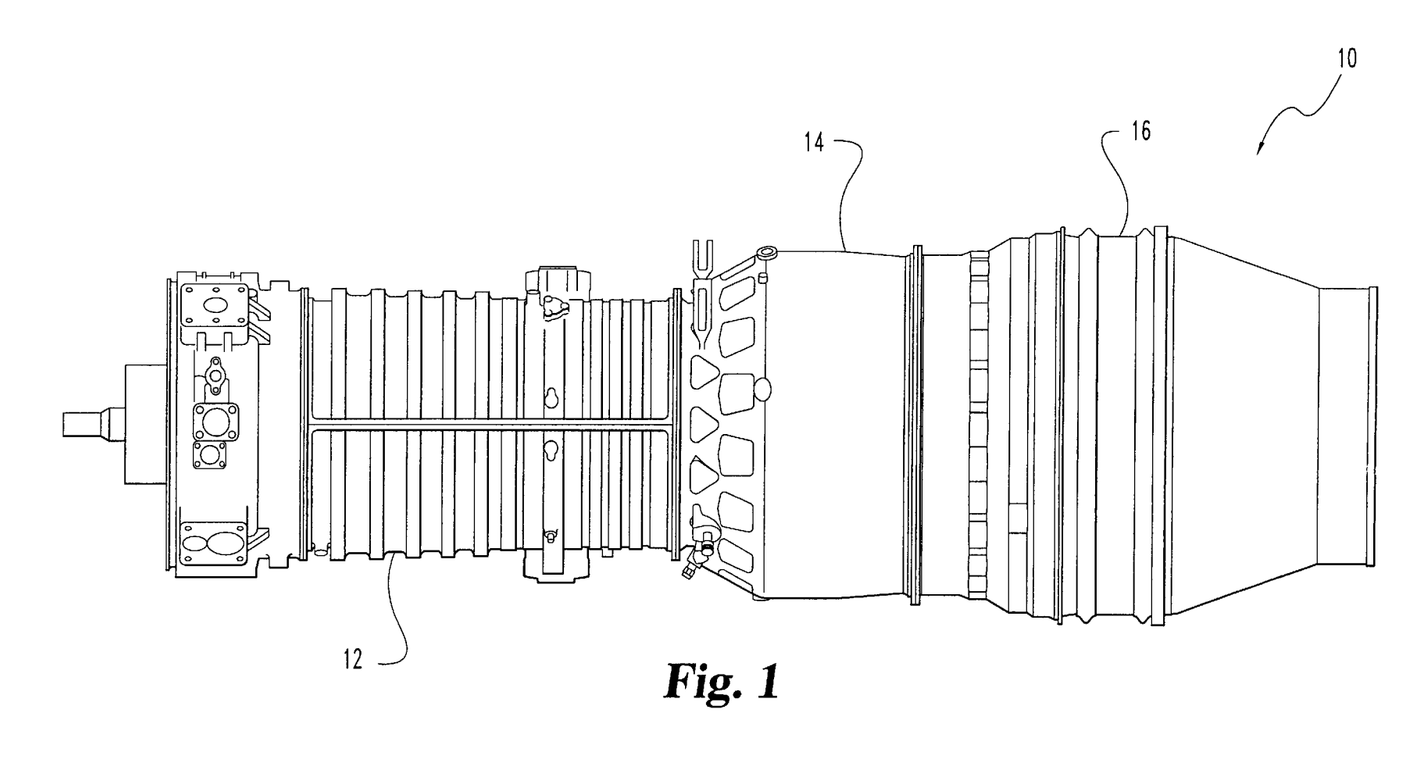
FIG. 1 is a side elevational view of a gas turbine engine core comprising one form of the bearing compartment vent system of the present invention.

Referring to FIG. 1, there is illustrated a gas turbine engine 10 that includes a compressor 12, a combustor 14, and a turbine 16. The three components have been integrated together to produce an aircraft flight propulsion engine. It is important to realize that there are multiple ways in which the components can be linked together. Additional compressors and turbines can be added with intercoolers connected between the compressors, and reheat combustion chambers could be added between the turbines. Further, the gas turbine engine 10 is equally well suited to be used for industrial applications, such as pumping stations for gas and oil transmission lines, electricity generation, and naval propulsion. Further, gas turbine engines are also applicable to vehicle propulsion systems.

Figure 2:
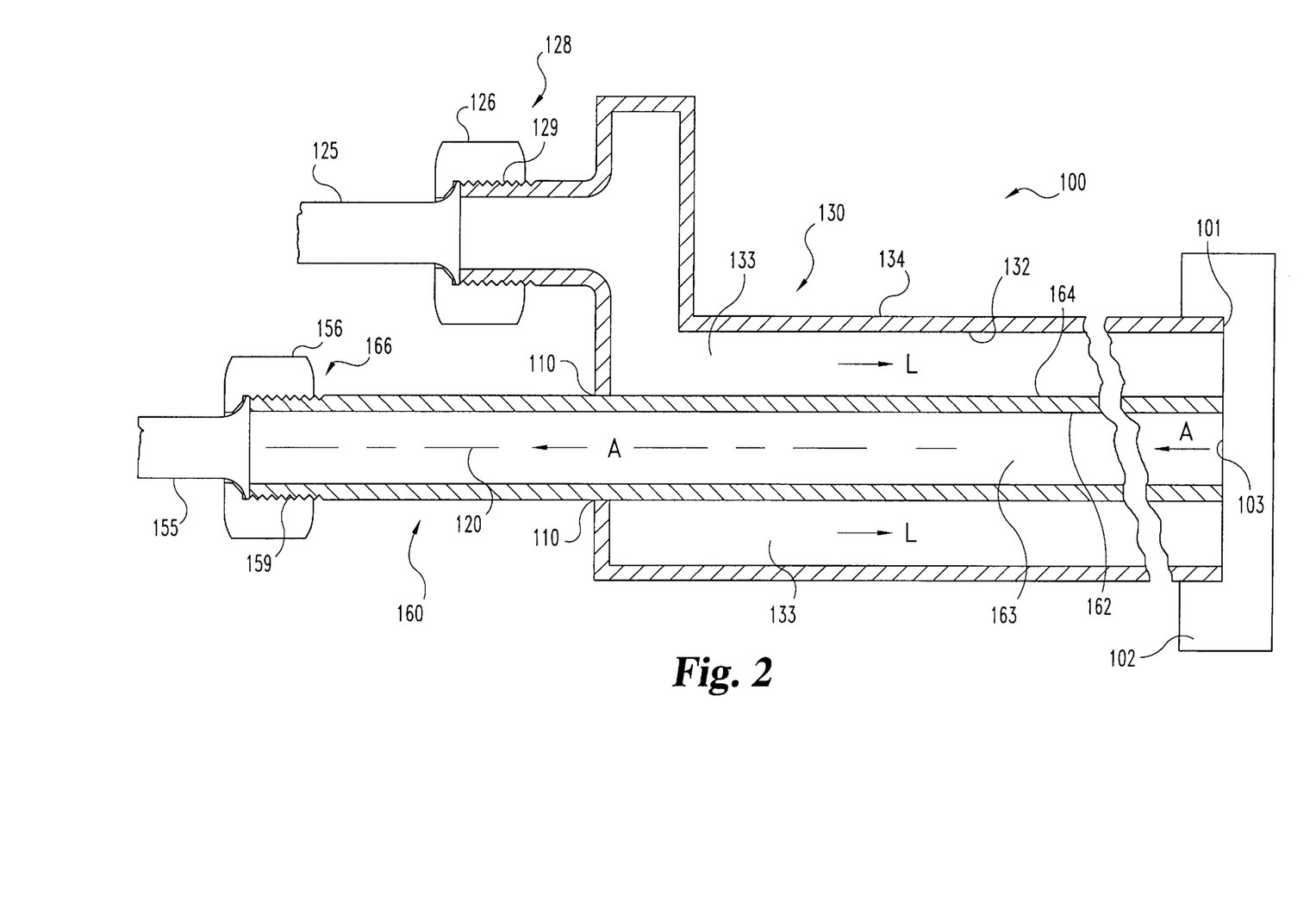
FIG. 2 is an illustrative cross-sectional view of the bearing compartment vent system comprising one form of the present invention.

Referring to FIG. 2 there is shown an illustrative cross-sectional view of one embodiment of the dual purpose lubricant conduit 100 of the present invention. While the present invention will generally be described with reference to a dual passage system it is contemplated herein that some forms of the present invention can have more than two passages. In simple terms one form of the present invention contemplates that the dual purpose lubricant conduit 100 generally has at least a portion of the lubricant fed into the bearing compartment through a first fluid flow passageway that is positioned substantially around at least a portion of a second fluid flow passageway. In one form, the dual purpose lubricant conduit has a compact design and construction that will take up less space than a system using multiple conduits that are not designed to have one fluid flow passageway positioned substantially around at least a portion of another fluid flow passageway. The second fluid flow passageway is adapted to vent air from the bearing compartment. It is understood that the air vented from the bearing compartment normally contains and/or has entrained therein a quantity of lubricant.

The embodiment of the present invention shown in FIG. 2 includes a lubricant feed line 125 which is connected to the inlet end 128 of lubricant feed conduit 130 by a connector 126. The lubricant feed line 125 is connected to a supply of lubricant (not illustrated) that is appropriate for gas turbine engine applications. Connector 126 is preferably threaded to match the external threading 129 on the inlet end 128 of the lubricant conduit 130. Lubricant conduit 130 has an outer surface 134 and an inner surface 132 extending between the inlet end 128 and an outlet end 101 that delivers the lubricant into the bearing compartment 102 of the gas turbine engine. Lubricant flows generally in the direction indicated by the arrows "L" within fluid flow passageway 133 defined between the inner surface 132 of lubricant conduit 130 and the outer surface 164 of air vent conduit 160. The present invention is not intended to be limited to the use of threaded connectors and/or a separate lubricant feed line. It is understood that the connector can be a friction type, brazed type, welded type or any other connector suitable for the intended purpose of coupling two devices together and believed known to one of ordinary skill in the art.

Air vent conduit 160 has outer surface 164 and an inner surface 162 extending between outlet end 166 and an inlet end 103 that is adapted to receive air, which may contain lubricant, from the bearing compartment 102 of the gas turbine engine. The inner surface 162 defines a channel 163 through which the vented air flows from the bearing compartment in the direction indicated by the arrow "A". In one form the air vent conduit 160 is connected to an air vent line 155 by a threaded connector 156 having internal threading that matches the external threading 159 on the outlet end 166 of the air vent conduit 160. However, it is understood that alternate connectors are contemplated herein including, but not limited to, friction type, brazed type, welded type or any other connector suitable for the intended purpose of coupling two devices together and believed known to one of ordinary skill in the art. Further, at least one form of the present invention does not include an air vent line 155, as the air is directly discharged from the air vent conduit to the surrounding environment.

Figure 6:
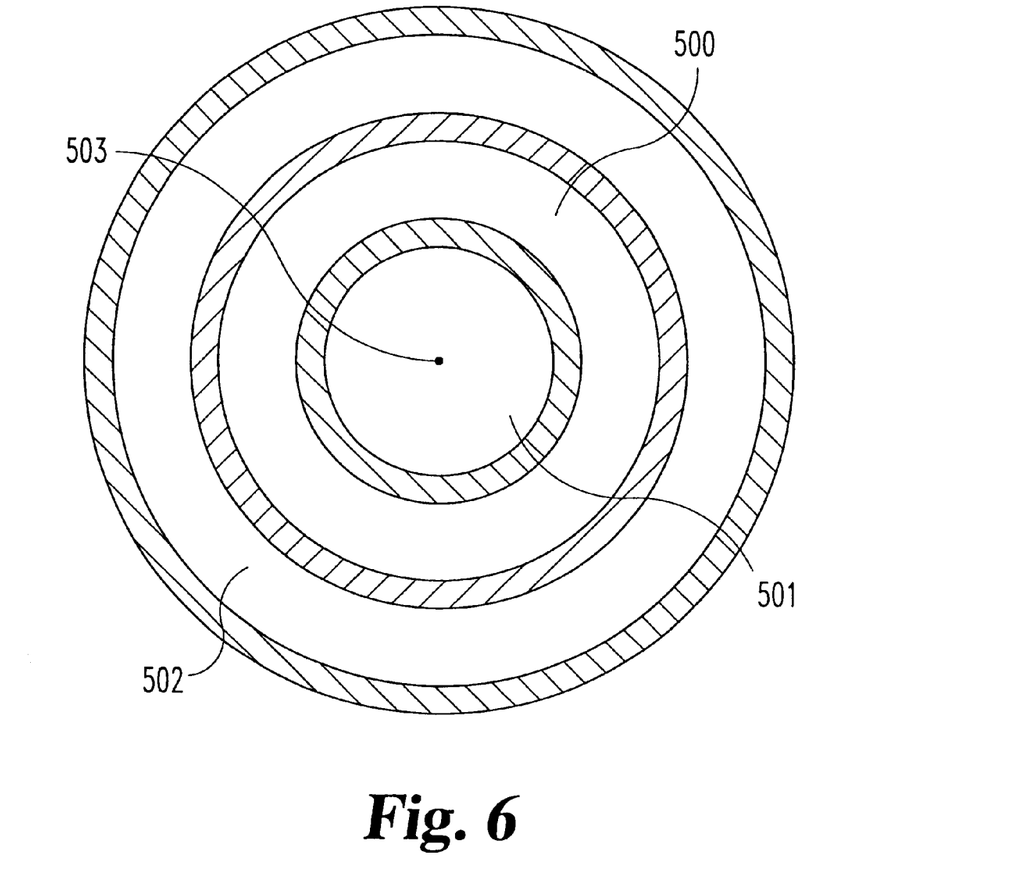
FIG. 6 is a schematic cross sectional view of a bearing compartment vent system which comprises an intermediate passageway.

In one form the air vent conduit 160 and lubricant feed conduit 130 are substantially coaxial and concentric around a central axis 120 along at least a portion of their lengths. It should be understood, however, that the two conduits 130, 160 need not be concentric and do not have to have the same central axis 120. The channel 133 defined between the inner surface 132 of lubricant conduit 130 and the outer surface 164 of the air vent conduit is substantially annular. Further, it is contemplated as within the scope of the invention, that the channel 133 may thus take on other geometric configurations, some of which may even vary along the length of the conduits. Moreover, while the preferred embodiment is for at least a portion of the length of the air vent conduit 160 to be received within the lubricant feed conduit 130, the reverse situation where the lubricant feed conduit 130 is received within the air vent conduit 160 is also contemplated as within the scope of the invention. The embodiment of dual purpose lubricant conduit 100 shown in FIG. 2 has conduits 130, 160 in the form of substantially cylindrical tubes of constant cross-section. It should also be understood that the conduits may have a variety of cross-sections that need not be cylindrical and, moreover, may vary along the length of the conduits. Further, one form of the present invention contemplates that the air vent conduit may include multiple conduits located within the lubricant feed conduit. In another form of the present invention illustrated schematically in FIG. 6 there is contemplated a vent system which includes at least one intermediate passageway 500 positioned between the air vent conduit 501 and the lubricant feed conduit 502. The intermediate passageway 500 in one embodiment is substantially co-axial and concentric with the air vent conduit 501 and lubricant feed conduit 502 around the central axis 503. However, it should be understood, that the intermediate passageway need not be concentric with these other passages and does not have to have the same central axis.

A wide variety of configurations are contemplated as within the scope of the invention for peripheral elements shown in FIG. 2, such as the interface 110 between the lubricant feed conduit 130 and air vent conduit 160. While the interface 110 is shown as integrally formed, it may be separate pieces wherein one conduit is inserted within another, and may further include various coupling mechanisms at the interface 110 known to those of skill in the art as well as seals to prevent the escape of fluid from the channel 133.

It should further be understood that the present invention may provide a variety of advantages depending on the specific application that it is utilized in. For example, one form of the present invention includes counter flowing lubricant-feed-in and air-vent-out into a single assembly. As previously mentioned, many bearing compartments operate in high temperature environments, so the constant flow of the lower temperature lubricant through the lubricant feed conduit 130 will operate to lower the temperature of the air vent conduit 160. Since the inner surface 162 of the air vent conduit 160 is at a lower temperature, the vent air flowing through channel 163 will also be at a lower temperature thereby minimizing and/or eliminating the coking of lubricant in the air vent conduit 160. It should be appreciated that lubricant coking can form deposits that block the air vent conduit 160 and lead to overpressurization in the bearing compartment. The heat transfer from the vent air flowing through channel 163 in air vent conduit 160 to the lower temperature lubricant flowing through channel 133 in lubricant feed conduit 130 functions to minimize or eliminate the potential for coking in the air vent conduit 160.

Figure 3:
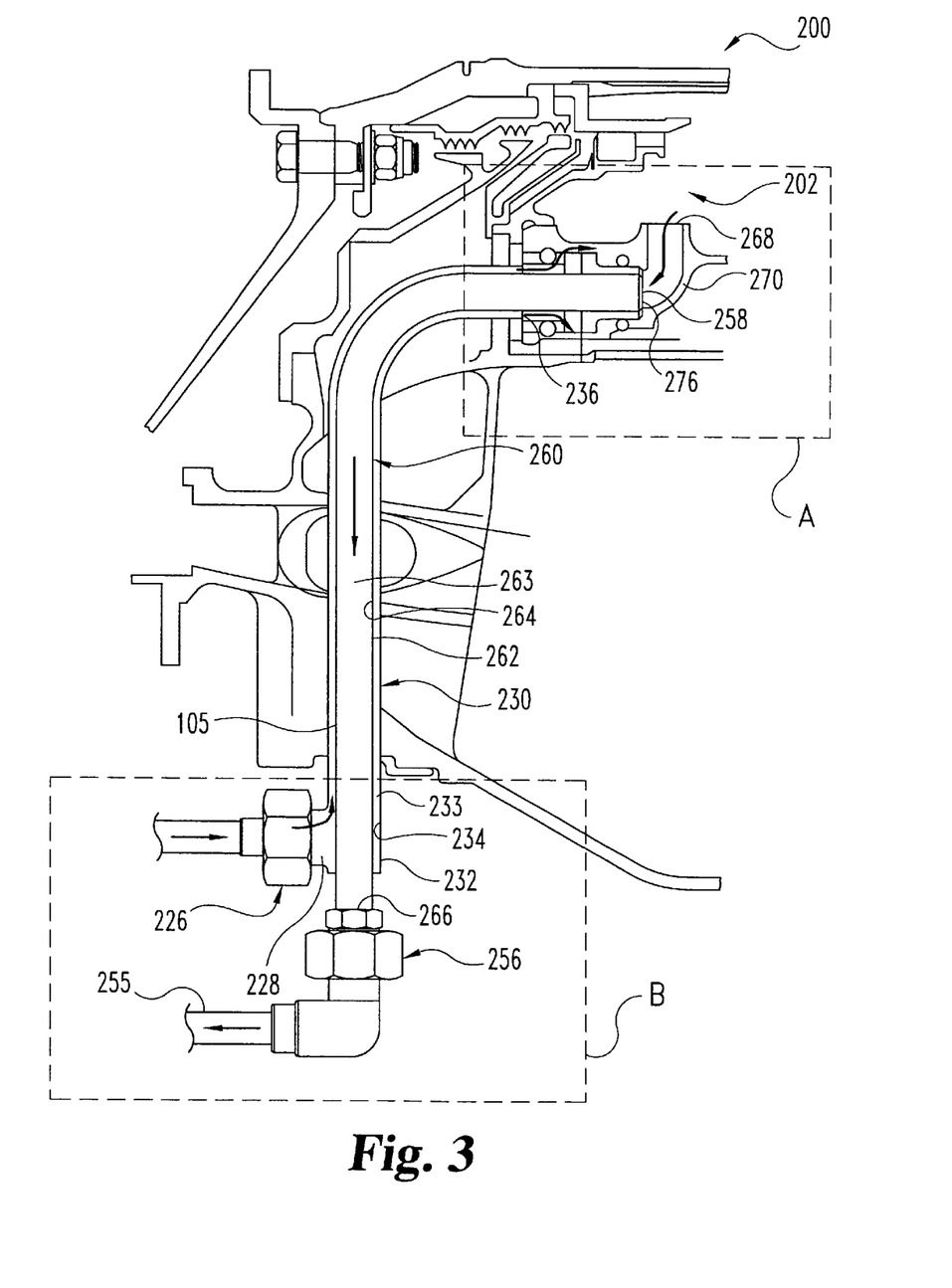
FIG. 3 is an illustrative side elevational view of another embodiment of the bearing compartment vent system coupled to the bearing compartment of the gas turbine engine of FIG. 1.
Figure 4:
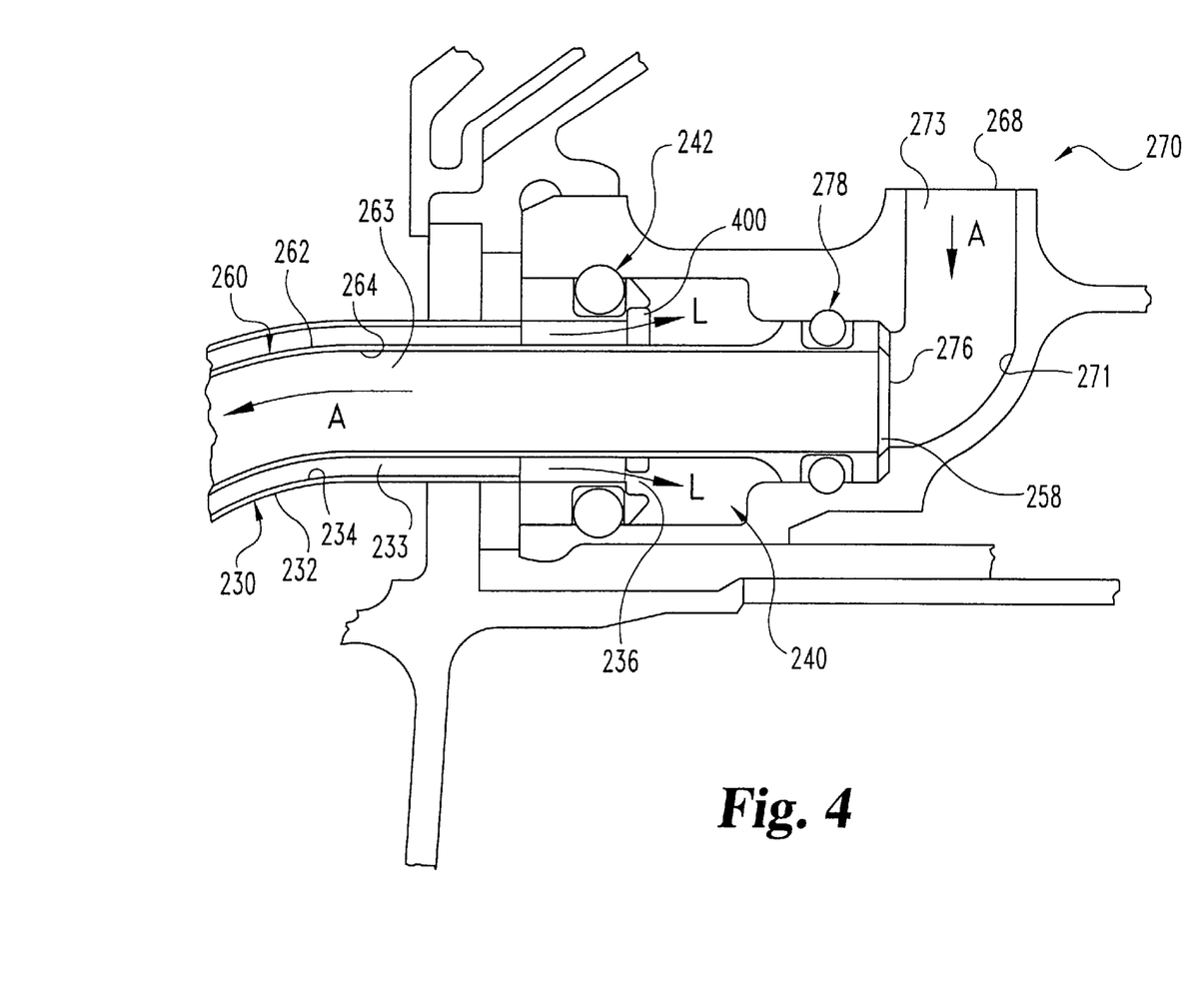
FIG. 4 is an enlarged view of a portion 'A' of FIG. 3.
Figure 5:
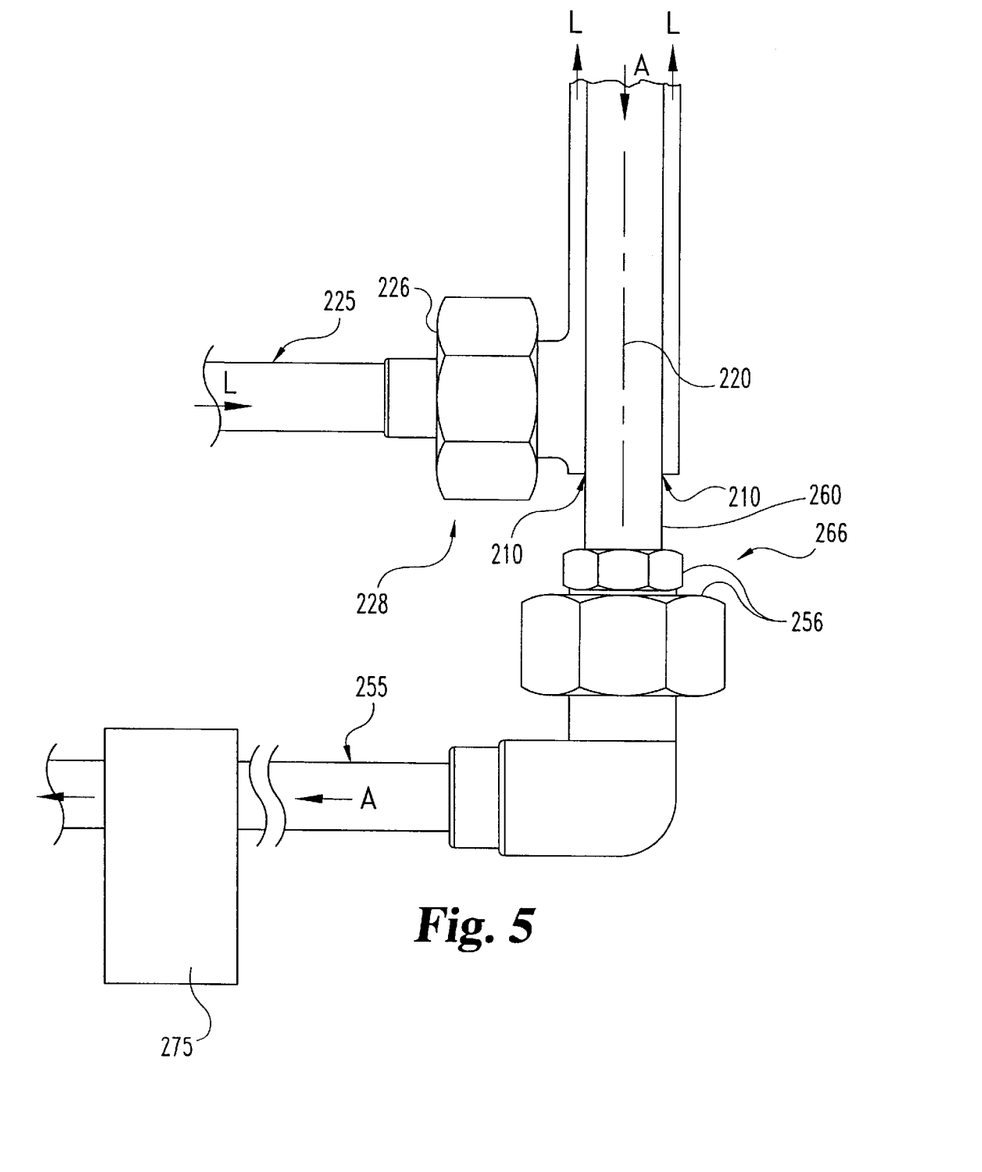
FIG. 5 is an enlarged view of a portion 'B' of FIG. 3.

With reference to FIGS. 3–5, there is illustrated a sectional view of a portion 200 of the gas turbine engine 10 which includes one embodiment of the dual purpose lubricant conduit 105 of the present invention. A pressurized lubricant, such as but not limited to oil, is fed into the bearing compartment 202 through a lubricant feed conduit 230 which comprises a portion of the dual purpose lubricant conduit 105. The vent air escapes from the bearing compartment 202 by flowing through air inlet 268 to the air vent conduit 260. As previously mentioned, the lubricant is preferably pressurized in order to properly lubricate the bearing compartment 202. The vent air leaving outlet 276 enters the inlet end 258 of air vent conduit 260. In one embodiment the air vent conduit 260 is preferably substantially concentric and coaxial with the lubricant feed conduit 230. However, the air vent conduit 260 and lubricant feed conduit 230 do not have to be coaxial and/or concentric. The relatively hot pressurized air (containing some lubricant) from the bearing compartment 202 is vented through the air vent conduit 260 to an environment external to the bearing compartment 202. The lubricant feed conduit 230 feeds lubricant into the bearing compartment 202. The lubricant flowing in the lubricant feed conduit normally cools the vent air passing through the air vent conduit 260, thus minimizing or eliminating coke formation within the air vent conduit 260.

With reference to FIG. 4, there is illustrated an enlarged view of the portion 'A' of FIG. 3. The bearing compartment 202 includes the air inlet 268 having an inner surface 271 defining a channel 273 extending between the inlet 268 and an outlet 276. The outlet 276 of air inlet 268 leads to the inlet 258 of air vent conduit 260. The bearing compartment 202 also includes a lubricant inlet portion 240 where lubricant exiting the outlet end 236 of lubricant conduit 230 enters the bearing compartment 202. In one embodiment, the outlet 276 preferably includes a seal 278 that is utilized to minimize leakage of the lubricant into the air vent conduit. The lubricant feed conduit 230 is coupled to the lubricant inlet portion 240 of the bearing compartment 202 at outlet end 236 of lubricant conduit 230. The coupling of outlet end 236 of lubricant feed conduit 230 to lubricant inlet portion 240 includes a seal 242. The flow of the vented air is indicated by arrow "A," and the flow of the lubricant is indicated by arrows "L." The flows of the vented air and lubricant feed are preferably in opposite directions as shown to maximize the flow of heat from the vented air to the feed lubricant. In one embodiment of the present invention a member 400 is attached to the outer surface of the air vent conduit 260 to maintain spacing between the air vent conduit 260 and the lubricant feed conduit 230. The member 400 is adapted to limit the axial movement of the air vent conduit 260 relative to the lubricant feed conduit 230 in one direction. In a preferred form the member 400 defines a ring located ahead of the seal 242. It is understood that other embodiments of the present invention may not include the member 400.

With reference to FIG. 5, there is illustrated an enlarged view of the portion 'B' of FIG. 3. Outlet end 266 of the air vent conduit 260 is connected to an air vent line 255 by a connector 256, and the oil feed line 225 is connected to the lubricant conduit 230 by a connector 226. The air vent connector 256 and the lubricant feed connector 226 can be connectors as generally known by those skilled in the art, such as threaded connectors. The air in the air vent line 255 is preferably sent to a deoiler 275 to remove the oil, and then the air is vented to the atmosphere. However, the present invention contemplate a system absent the deoiler and other systems of the present invention may include other types of devices to condition the vent air prior to discharge from the gas turbine engine. The lubricant is fed, as indicated by arrow "L," to the lubricant feed conduit 230 from oil feed line 225. The lubricant feed conduit 230 and the air vent conduit 260 are connected generally along the interface 210. In one form, the lubricant feed conduit 230 and the air vent conduit 260 are cylindrical tubes. However, it is contemplated as within the scope of the invention that both conduits 230 and 260 can have a wide variety of different configurations known by those skilled in the art.

It should be understood that where the above described embodiments of the present invention refer to oil, that the term oil is intended to encompass any type of lubricant that may be used. Further, the term lubricant is intended to include a gaseous phase lubricant and/or a liquid phase lubricant unless specifically limited to the contrary. The preferred lubricant for gas turbine engines is generally a synthetic oil tailored to have properties compatible with the hostile environment it is used in. A wide variety of lubricants, however, are contemplated as within the scope of the invention. Further, in another form of the present invention there is contemplated the passage of other fluids besides a lubricant within the lubricant feed conduit.

In one form of the present invention there is contemplated a system comprising a dual purpose lubricant conduit having an inner air vent conduit and an outer lubricant inflow conduit. The dual purpose lubricant conduit includes a bearing housing mounting end. A locating member is attached to the outer surface of the air vent conduit and a portion of the locating member is designed to abut the end of the outer lubricant inflow conduit that delivers lubricant to the bearing housing. The locating member functions to maintain the relative position between the inner air vent conduit and the outer lubricant inflow conduit.

In another form of the present invention there is contemplated a system comprising an inner air vent conduit adapted for the passage of vent air from a bearing housing and an outer conduit adapted for the holding of a fluid. In another form the pressure of the fluid within the outer conduit is substantially at ambient pressure in a substantially non-dynamic state and functions as an insulator. The outer conduit is located substantially around the inner air vent and the system is coupled to a bearing housing.

While the invention has been illustrated and described in detail in the drawings and the foregoing description, the same is to be considered as illustrative and not restrictive in character, it being understood that only the preferred embodiment has been shown and described and that all changes, equivalents, and modifications that come within the spirit of the invention defined by the following claims are desired to be protected. In reading the claims, it is intended that when words such as "a," "an," "at least one," "at least a portion," or "a portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus coupled to a bearing compartment of a gas turbine engine, comprising:
   a first conduit having an inner surface and an outer surface;
   a second conduit having an inner surface and an outer surface; and,
   wherein at least a portion of the second conduit is substantially enclosed by at least a portion of the first conduit such that the outer surface of the second conduit generally faces the inner surface of the first conduit, and wherein one of the first conduit and the second conduit is a lubricant feed conduit adapted for the passage of a lubricant to the bearing compartment and the other of the first conduit and the second conduit is an air vent conduit adapted for the passage of a vent air from the bearing compartment.

2. The apparatus of claim 1, wherein the first conduit is the lubricant feed conduit.

3. The apparatus of claim 2, wherein the first conduit has a first end and a second end, and the first end of the first conduit is connected to a lubricant feed line and the second end of the first conduit is connected to a lubricant inlet portion of the bearing compartment.

4. The apparatus of claim 2, wherein the first conduit has a first end and a second end, and the first end of the first conduit is adapted for the entrance of the lubricant to the first conduit and the second end of the first conduit is adapted for the exit of the lubricant from the first conduit.

5. The apparatus of claim 1, wherein the first conduit is the lubricant feed conduit, and wherein the second conduit has a first end and a second end, and the first end of the second conduit is connected to an air vent outlet in the bearing compartment.

6. The apparatus of claim 5, wherein the first end of the second conduit is adapted for the entrance of vent air through the air vent outlet and the second end of the second conduit is adapted for the exiting of vent air from the second conduit.

7. The apparatus of claim 1, wherein the first conduit has a first end and a second end, and wherein the first end of the first conduit is connected to a lubricant feed line and the second end of the first conduit is connected to a lubricant inlet portion of the bearing compartment, and wherein the second conduit has a first end and a second end, and further wherein the first end of the second conduit is connected to an air vent outlet in the bearing compartment and the second end of the second conduit is connected to an air vent line.

8. The apparatus of claim 7, wherein the first conduit and the second conduit are substantially concentric along at least a portion of the conduits.

9. The apparatus of claim 1, which further includes a third conduit disposed between the first conduit and the second conduit.

10. The apparatus of claim 2, wherein the first conduit and the second conduit are adapted to have fluid flow in a counter flow relationship.

11. The apparatus of claim 1, wherein the air vent conduit is defined by a plurality of conduits.

12. A system, comprising:
   a gas turbine engine including a bearing compartment;
   a first conduit extending between an inlet end and an outlet end and having an inner surface and an outer surface;
   a second conduit extending between an inlet end and an outlet end and having an interior surface and an exterior surface, wherein at least a portion of the first conduit is positioned within the second conduit; and,
   wherein the inner surface of the first conduit defines a first fluid flow passageway in fluid communication with the bearing compartment and adapted to vent air from the bearing compartment, the interior surface of the second conduit defines a second fluid flow passageway in fluid communication with the bearing compartment and adapted to feed a lubricant to the bearing compartment.

13. The system of claim 12, wherein the first conduit and the second conduit are substantially concentric along at least a part of their length.

14. The system of claim 13, wherein the e second fluid d flow passageway is defined between the outer surface of the first conduit and the interior surface of the second conduit.

15. A method for delivering a lubricant to a gas turbine engine bearing compartment, comprising:
   feeding the lubricant through a first fluid flow passageway to the bearing compartment; and
   flowing a vent air from the bearing compartment through a second fluid flow passageway, wherein the second fluid flow passageway is surrounded by and in a heat transfer association with the first fluid flow passageway.

16. The method of claim 15, which further includes transferring heat from the vent air flowing in the second fluid flow passageway to the lubricant in the first fluid flow passageway.

17. The method of claim 16, wherein the vent air contains a quantity of lubricant therein, and which further includes reducing the temperature of the vent air to minimize the formation of deposits in the second fluid flow passageway.

18. The method of claim 16, wherein the vent air includes a quantity of lubricant, and which further includes transferring heat from the vent air to the lubricant to prevent coking in the second fluid flow passageway.

19. The method of claim 16, which further includes pressurizing the lubricant prior to the feeding.

20. The method of claim 15, wherein the feeding and the flowing are in substantially opposite directions.

21. The method of claim 15, wherein the second fluid flow passageway is defined by a plurality of conduits, and wherein the flowing is in the plurality of conduits.

22. An apparatus, comprising:
   a bearing housing;
   an air vent conduit in fluid communication with the bearing housing and adapted to allow the passage of air from the bearing housing;
   a lubricant feed conduit in fluid communication with the bearing housing and adapted to allow the feeding of a lubricant to the bearing housing, at least a portion of the lubricant feed conduit is disposed about the air vent conduit; and
   wherein the lubricant feed conduit with lubricant therein and the air vent conduit with vent air therein define an anti-coking means for preventing coking in the air vent conduit.

23. The apparatus of claim 22, which further includes a third conduit, at least a portion of said third conduit is substantially enclosed by at least a portion of said first conduit and wherein at least a portion of said second conduit is substantially enclosed by said at least a portion of said third conduit.

24. The apparatus of claim 22, wherein the air vent conduit is adapted to allow the passage of air containing a quantity of lubricant.

* * * * *